United States Patent

Iwano et al.

Patent Number: 6,155,230
Date of Patent: Dec. 5, 2000

[54] CONTROL APPARATUS AND METHOD FOR INTERNAL COMBUSTION ENGINE

[75] Inventors: Hiroshi Iwano; Isamu Kazama, both of Kanagawa, Japan

[73] Assignee: Nissan Motor Co., Ltd., Yokohama, Japan

[21] Appl. No.: 09/143,368

[22] Filed: Aug. 28, 1998

[30] Foreign Application Priority Data

Aug. 28, 1997 [JP] Japan .................................. 9-232257

[51] Int. Cl.[7] ............................ F02D 41/04; F02D 43/00
[52] U.S. Cl. ................................ 123/339.16; 123/406.24; 123/406.45; 123/436; 123/493; 123/399; 180/197; 477/109
[58] Field of Search ...................... 123/406.24, 406.25, 123/325, 326, 352, 339.16, 339.17, 339.18, 361, 399, 478, 493, 436, 406.45; 180/197; 477/109

[56] References Cited

U.S. PATENT DOCUMENTS

| | | | |
|---|---|---|---|
| 4,395,984 | 8/1983 | Yamaguchi et al. | 123/325 |
| 4,919,096 | 4/1990 | Manaka et al. | 123/361 X |
| 4,962,570 | 10/1990 | Hosaka et al. | 123/399 |
| 5,566,776 | 10/1996 | Iwata | 180/197 |
| 5,732,380 | 3/1998 | Iwata | 123/336 X |
| 5,755,202 | 5/1998 | Stefanopoulou et al. | 123/399 |
| 5,906,185 | 5/1999 | Ishida et al. | 123/399 |
| 5,975,049 | 11/1999 | Kawasaki | 123/339.12 |
| 6,006,724 | 12/1999 | Takahashi et al. | 123/339.19 |
| 6,050,238 | 4/2000 | Suzuki et al. | 123/295 |

FOREIGN PATENT DOCUMENTS 4-101037  4/1992  Japan .

Primary Examiner—Tony M. Argenbright
Attorney, Agent, or Firm—Foley & Lardner

[57] ABSTRACT

In a control apparatus and method for a vehicular internal combustion engine, an accelerator operating variable detector is provided for detecting an operating variable of an accelerator operated by a driver, a revolution speed detector is provided for detecting a revolution speed of the engine, a driver demand torque calculator is provided for calculating an engine torque demanded by the vehicle driver on the basis of the detected operating variable of the accelerator and the detected revolution speed as a driver's demand torque. An external demand torque calculator is provided for calculating a correction variable for the engine torque demanded from an external load to the engine as an external demand torque, a relatively low response demand torque calculator is provided for calculating a relatively low response demand torque on the basis of at least one of the driver's demand torque and the external demand torque, a relatively high response demand torque calculator is provided for calculating a relatively high response demand torque on the basis of at least one of the driver's demand torque and the external demand torque. A first torque operator is provided for operating at least one object to be controlled in a relatively low response type so as to realize the calculated relatively low response demand torque, and a second torque operator is provided for operating at least one object to be controlled in a relatively high response type so as to realize the calculated relatively high response demand torque.

20 Claims, 13 Drawing Sheets

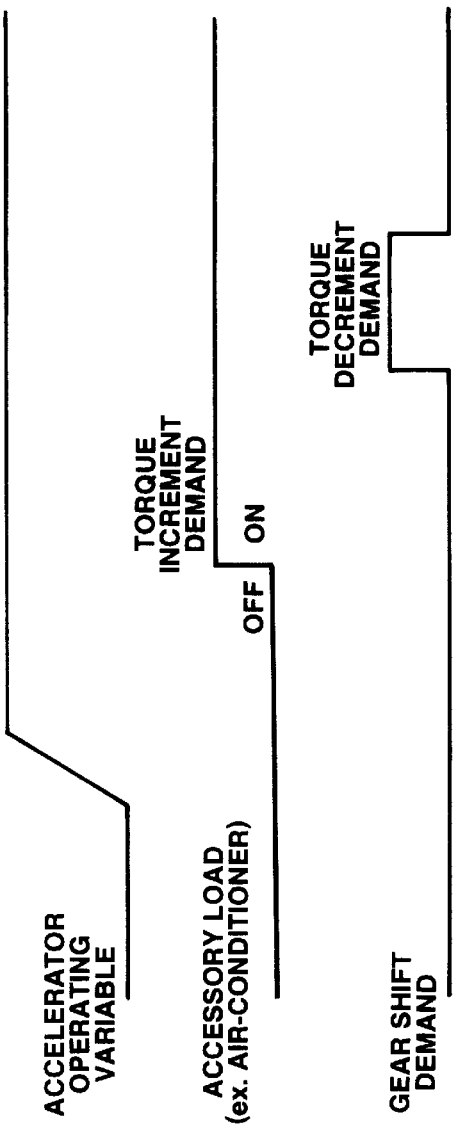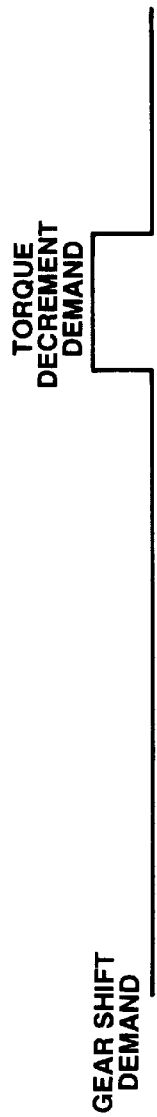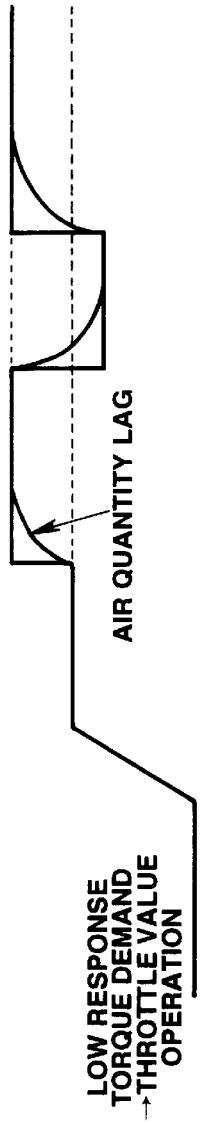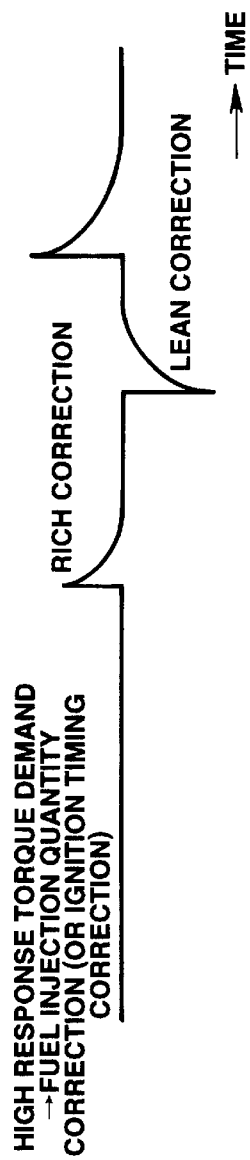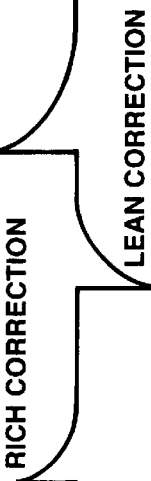
FIG.11A ACCELERATOR OPERATING VARIABLE
FIG.11B ACCESSORY LOAD (ex. AIR-CONDITIONER)
FIG.11C GEAR SHIFT DEMAND
FIG.11D LOW RESPONSE TORQUE DEMAND →THROTTLE VALUE OPERATION
FIG.11E HIGH RESPONSE TORQUE DEMAND →FUEL INJECTION QUANTITY CORRECTION (OR IGNITION TIMING CORRECTION)

6,155,230

CONTROL APPARATUS AND METHOD FOR INTERNAL COMBUSTION ENGINE

The contents of the Application No. Heisei 9-232257, with a filing date of Aug. 28, 1997 in Japan, are herein incorporated by reference.

BACKGROUND OF THE INVENTION a) Field of the Invention

The present invention relates to control apparatus and method for an internal combustion engine.

b) Description of the Related Art

A Japanese Patent Application First Publication No. Heisei 4-101037 published on Apr. 2, 1993 exemplifies a previously proposed engine control system.

The previously proposed engine control system disclosed in the above-identified Japanese Patent Application First Publication includes: means for detecting a first operating variable of an accelerator; means for setting a target torque of the engine on the basis of the detected first operating variable of the accelerator; means for setting a second operating variable of an engine throttle valve (electronically controlled (servo controller) throttle valve) on the basis of the set target torque; means for detecting an air-fuel mixture ratio of the engine; means for correcting the second operating variable of the throttle valve on the basis of the detected air-fuel mixture ratio; means for driving the throttle valve to adjust an opening angle thereof on the basis of the corrected second operating variable of the throttle valve; means for setting a fuel supply quantity on the basis of the corrected second operating variable of the engine; and means for driving fuel supply means to regulate the fuel supply quantity on the basis of the set fuel supply quantity.

SUMMARY OF THE INVENTION

However, since, in the previously proposed engine control system described in the BACKGROUND OF THE INVENTION, the target torque according to a request from a driver is calculated on the basis of the first operating variable of the accelerator, a basic operating variable on the engine throttle valve and a fuel injection quantity are set on the basis of the target torque, a difference in the intake air quantity is detected from a deviation between the stoichiometric air-fuel mixture ratio and an actual air-fuel mixture ratio {a deviation between a feedback correction coefficient (α) and a reference value (a value corresponding to the stoichiometric air-fuel mixture ratio) in the air-fuel mixture ratio feedback control}, the opening angle of the throttle valve is corrected on the basis of the deviation, and the intake air quantity is operated to achieve the target torque, an achievable controlled object is only the torque to the driver's request (driver's demand) and no consideration on the correction of an engine torque requested according to an operation state of an external torque (an accessory load such as an air-conditioner or a power assisted steering system) in order for an engine speed stabilization purpose and on a torque operation required in terms of a vehicular driveablity or stability has been paid.

Hence, in order to take these problems into consideration, it is necessary to have, e.g., another auxiliary air system in the engine, thus the cost of manufacture being increased and the system being complicated.

In addition, if, without having another auxiliary air system, the correction of the engine torque according to the condition of the external load to stabilize the engine revolution or the torque operation requested according to the vehicular stability or safety is carried out through the electronically controlled throttle valve operation, the throttle valve would be operated irrespective of the target torque on the driver's demand.

Hence, a continuity in the torque cannot be favorable and there is a possibility in worsening the driveability.

Furthermore, an intake air response delay inherent in the intake air system of the engine would cause a stepwise difference in the continuity of the torque to be occurred in a case where the correction of the engine torque according to the external load operation condition and the requested torque operation in terms of the vehicular driveability and safety purpose is carried out in terms of the electronically controlled throttle valve operation are carried out through the electronically controlled throttle valve operation.

It is therefore an object of the present invention to provide control apparatus and method for an internal combustion engine which can achieve most preferably an engine torque with an engine torque requested according to an operation condition of at least one engine accessory and that requested in terms of a vehicular driveability and safety, thus being capable of satisfying a driver's intention to drive a vehicle, a revolution stability, vehicular driveability and safety, each at high levels.

According to one aspect of the present invention, there is provided with a control apparatus for a vehicular internal combustion engine. The control apparatus comprises: a) an accelerator operating variable detector for detecting an operating variable of an accelerator operated by a vehicle driver; b) a revolution speed detector for detecting a revolution speed of the engine; c) a driver demand torque calculator for calculating an engine torque demanded by the vehicle driver on the basis of the detected operating variable of the accelerator and the detected revolution speed as a driver's demand torque; d) an external load demand torque calculator for calculating a correction variable for the engine torque demanded from an external load to the engine as an external demand torque; e) a relatively low response demand torque calculator for calculating a relatively low response demand torque on the basis of at least one of the driver's demand torque and the external demand torque; f) a relatively high response demand torque calculator for calculating a relatively high response demand torque on the basis of at least one of the driver's demand torque and the external demand torque; g) a first torque operator for operating at least one object to be controlled in a relatively low response type so as to realize the calculated relatively low response demand torque; and h) a second torque operator for operating at least one object to be controlled in a relatively high response type so as to realize the calculated relatively high response demand torque.

According to another aspect of the present invention there is provided with a control method for a vehicular internal combustion engine. The control method comprises: a) detecting a first operating variable of an accelerator operated by a vehicle driver; b) detecting a revolution speed of the engine; c) calculating an engine torque demanded by the vehicle driver on the basis of the detected operating variable of the accelerator and the detected revolution speed as a driver's demand torque; d) calculating a correction variable for the engine torque demanded from an external load to the engine as an external demand torque; e) calculating a relatively low response demand torque on the basis of at least one of the driver's demand torque and the external demand torque; f) calculating a relatively high response demand torque on the basis of at least one of the driver's demand torque and the external demand torque; g) operating at least one object to be controlled in a relatively low response type so as to realize the calculated relatively low response demand torque; and h) operating at least one object to be controlled in a relatively high response type so as to realize the calculated relatively high response demand torque.

This summary of the invention does not necessarily describe all necessary features so that the invention may also be a sub-combination of these described features.

BRIEF DESCRIPTION OF THE DRAWINGS

FIGS. 11A, 11B, 11C, 11D, and 11E are integrally a timing chart for explaining an example of each torque operation in the preferred embodiment shown in FIG. 1A.

BEST MODE FOR CARRYING OUT THE INVENTION

Reference will hereinafter be made to the drawings in order to facilitate a better understanding of the present invention.

Figure 1A:
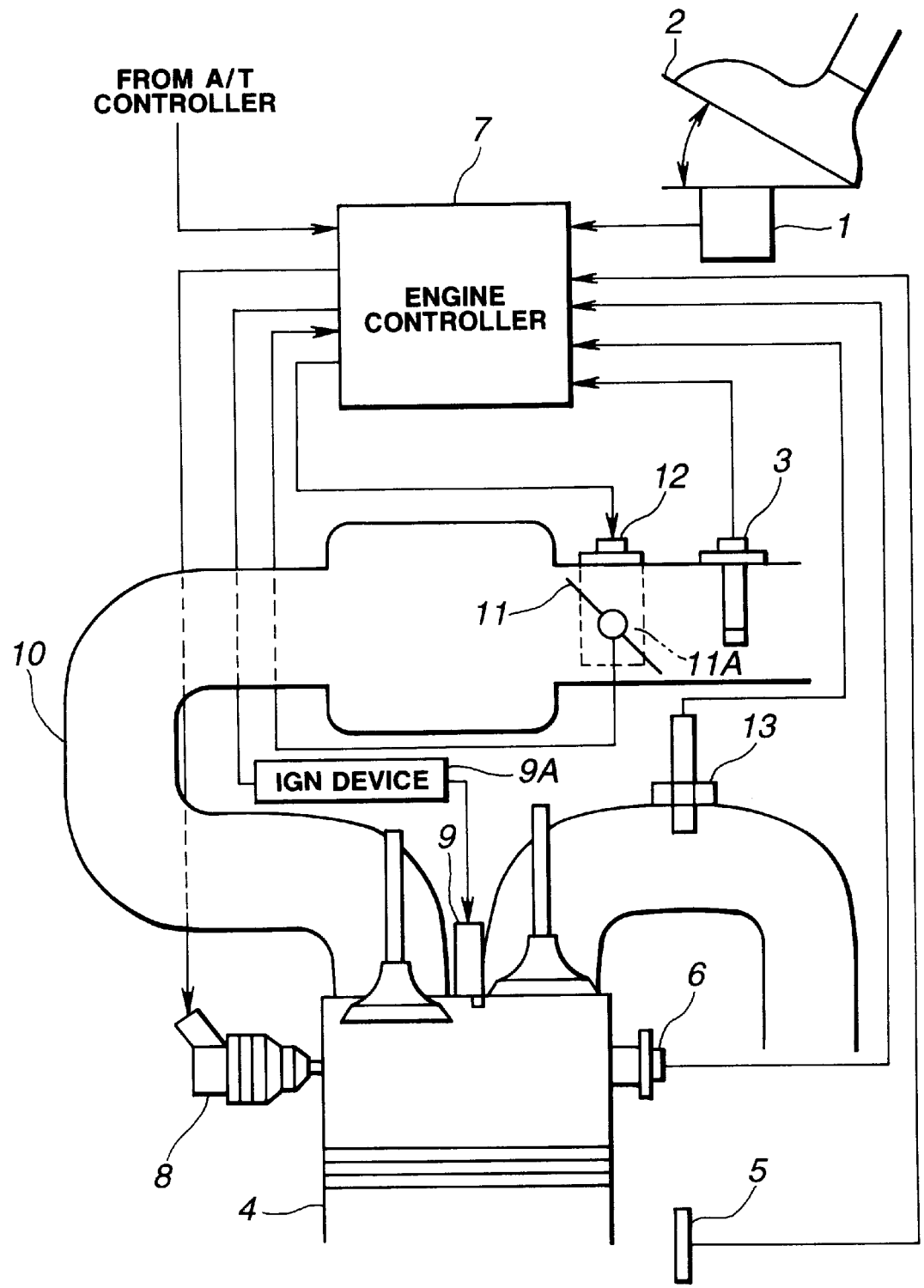
FIG. 1A is a schematic circuit block diagram of an internal combustion engine to which a control apparatus in a preferred embodiment according to the present invention is applicable.

FIG. 1A shows a system configuration of a control apparatus for an internal combustion engine in a preferred embodiment according to the present invention.

An accelerator opening angle sensor 1 as a detector for detecting a first operating variable of an accelerator (accelerator pedal 2) is provided for detecting an operating angle (depression angle, i.e., the first operating variable) of the accelerator pedal 2 operated by a vehicle driver.

The accelerator opening angle sensor 1 includes, for example, a potentiometer.

An airflow meter 3 as one of engine operating condition detectors is installed within an intake air passage 10 so as to detect an intake air quantity of the engine 4 (hereinafter, often referred to as intake air quantity).

A crank angle sensor 5 for detecting an engine revolution speed (also referred to as an engine speed) is provided for generating a signal whenever an engine crankshaft is revolved by a unit crankshaft revolution angle (for example, 1°) in synchronization with the revolution of the engine crankshaft (or a camshaft). If the number of generated signals per unit time is measured or if a generation period of the signal is measured, the engine speed NE can be determined.

A coolant temperature sensor 6 for detecting a coolant temperature of the engine 4 is disposed so as to be exposed to a coolant jacket of the engine 4 as another engine operating condition detector.

A fuel injection valve 8 for directly injecting a fuel into each corresponding combustion chamber (cylinder) and is driven in response to a fuel injection signal supplied from a controller 7.

Figure 1B:
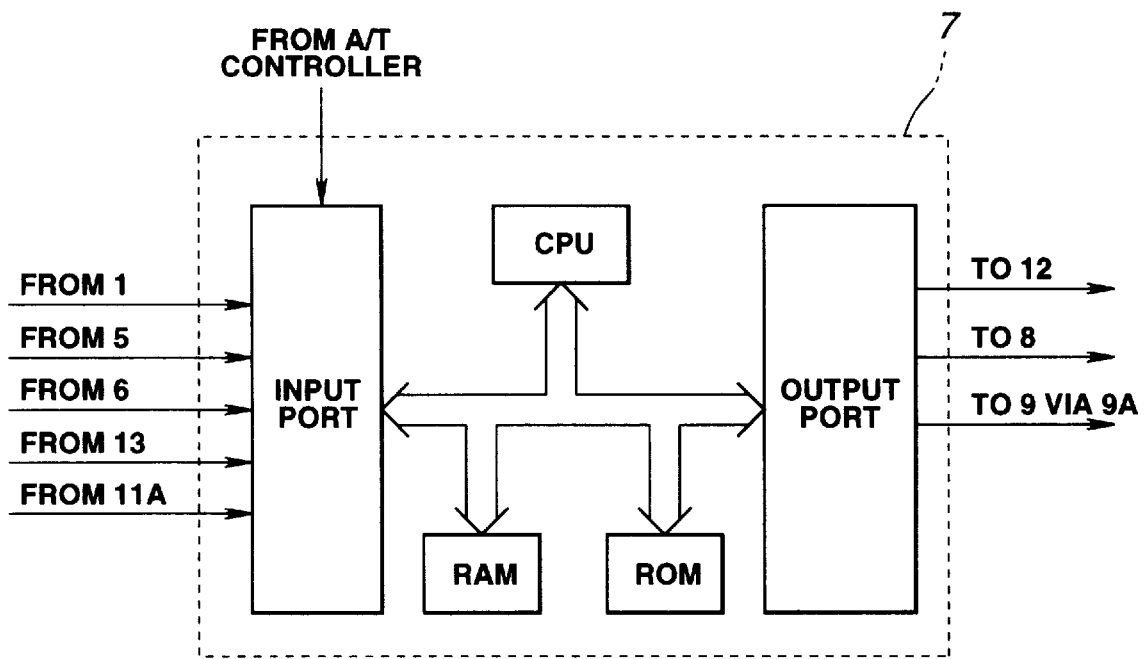
FIG. 1B is a circuit block diagram of an engine controller shown in FIG. 1A.

The controller 7, as shown in FIG. 1B, includes a microcomputer having a CPU (Central Processing Unit), ROM (Read Only Memory), RAM (Random Access Memory), Input Port, Output Port, and a common bus.

In addition, an ignition plug 9 for performing an ignition of fuel on the basis of an ignition signal derived from the controller 7 via an ignition device 9A is installed in each cylinder of the engine 4.

A throttle valve controller 12 is provided for controlling an opening angle of an electronically controlled throttle valve 11 as one of the intake air controller and includes an actuator, for example, a DC motor.

The throttle valve 11 is interposed within the intake air passage 10 as the intake air system of the engine 10 as an intake air quantity controlling valve.

A throttle sensor 11A for detecting an opening angle of the throttle valve 11 is provided.

An exhaust gas system of the engine 4 is provided with an oxygen (concentration) sensor 13 for detecting an oxygen concentration in the exhaust gas so as to determine an air mixture fuel supplied to the engine 4 and is provided at a downstream side to the oxygen sensor 13 with a catalytic converter used to purify the exhaust gas.

A detection signal from each of various sensors described above is inputted into the controller 7.

The controller 7 determines the engine operating condition on the basis of the signals from the sensors and calculates a target intake air quantity, and an ignition timing according to the detected engine operating condition.

The controller 7 controls the opening angle of the throttle valve 11 via the throttle valve controller 12 so as to achieve the calculated intake air quantity.

The controller 7 drives each fuel injection valve 8 on the basis of the calculated fuel injection quantity and controls each ignition plug 9 on the basis of the calculated ignition timing.

It is noted that a variable valve timing device (not shown) for operating a revolution phase difference of a cam to open or close an intake and exhaust valve of the engine 4 to variably control an open-and-closure timing of each of the intake and exhaust valves of the engine 4 may be installed and/or a swirl control valve device for controlling a swirl within each corresponding combustion chamber may be installed within the intake port.

In both cases, the controller 7 may control these devices according to the determined engine driving condition of the engine 4.

Next, a control operation carried out by the controller 7 will be described below.

Figure 3:
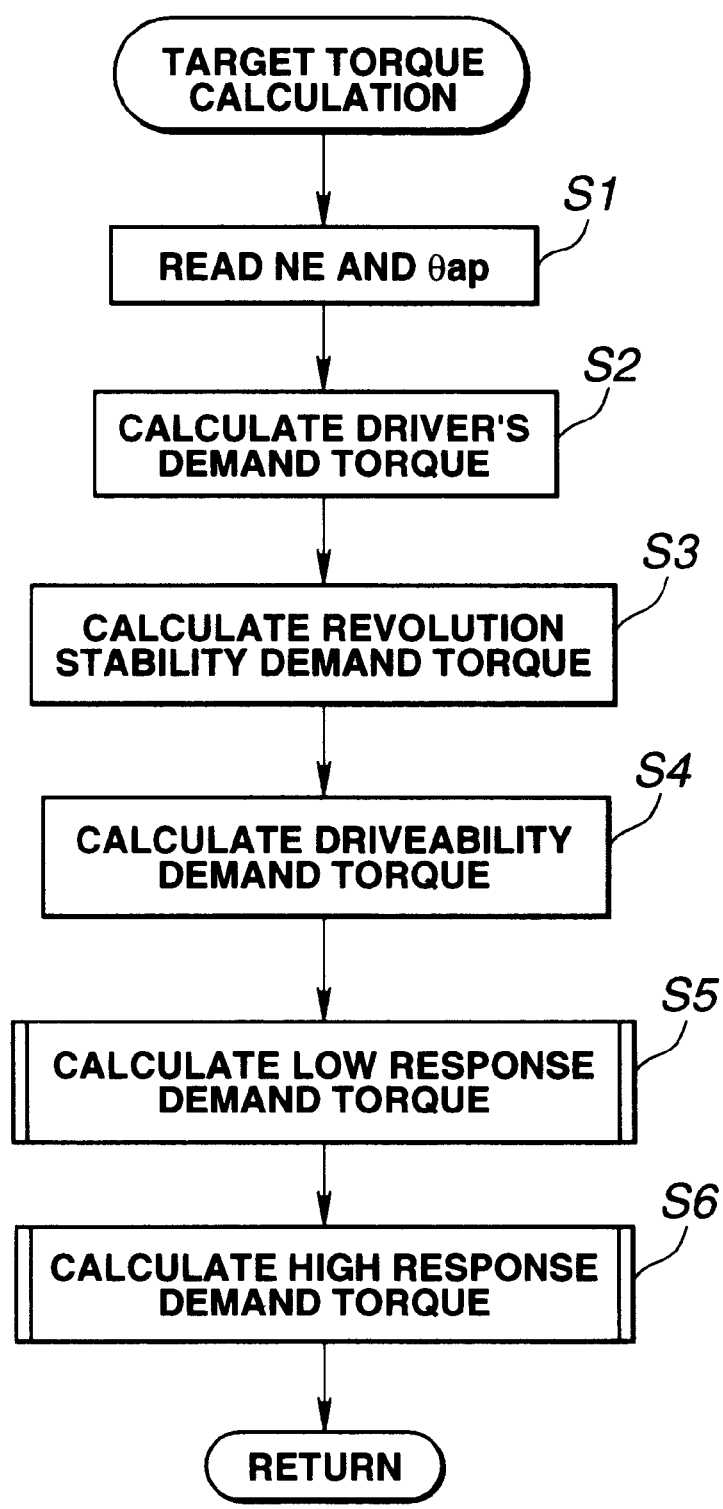
FIG. 3 is a general flowchart for explaining a calculation routine of a target torque to be generated from the engine executed in the preferred embodiment shown in FIG. 1A.

FIG. 3 shows a calculation routine of a target torque (an engine operation torque required to finally achieve a driver's demand torque) executed in the preferred embodiment.

In FIG. 3, at a step S1, the CPU of the controller 7 reads the first operating variable θap of the accelerator 2 and engine speed NE derived on the basis of the signal from the crank angle sensor 5.

At a step S2, the controller 7 calculates the driver's demand torque on the basis of the first operating variable θap and the engine speed Ne read at the step S1.

Figure 4:
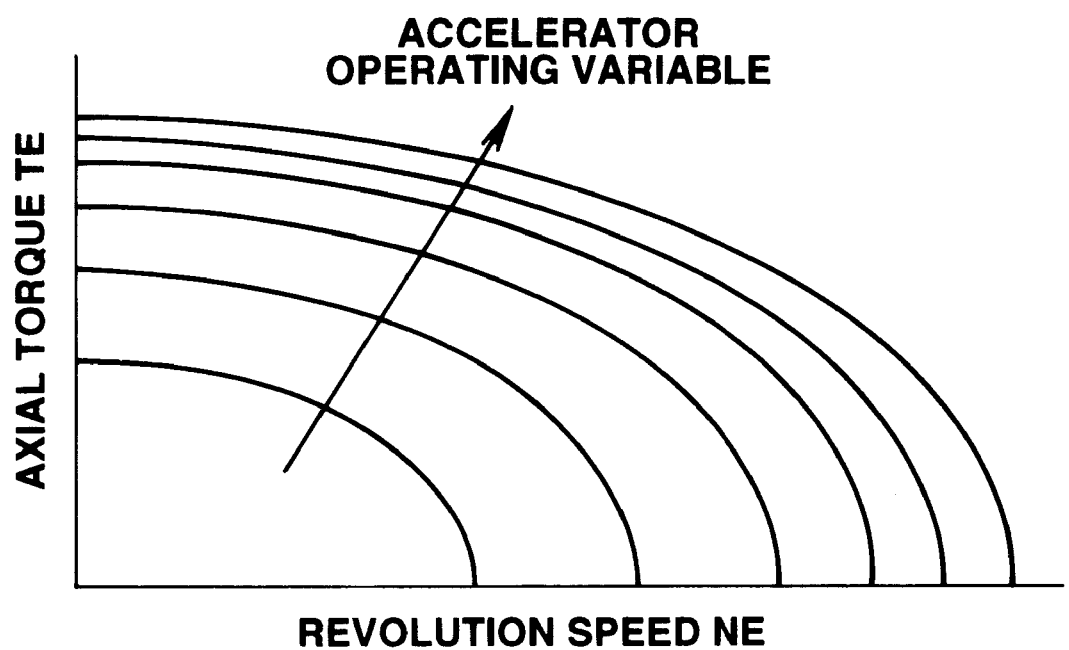
FIG. 4 is an example of a map referring to a target torque from an engine revolution speed NE and an axial torque TE.

For example, as shown in FIG. 4, with an axial torque with respect to the engine revolution speed Ne and the first operating variable θap derived through experiments, the CPU of the controller 7 retrieves the driver's demand torque from a map of FIG. 4 based on the experimental data.

At a step S3, the CPU of the controller 7 calculates a torque demanded according to an operating condition of an engine accessory to stabilize an engine revolution (hereinafter, also called a revolution stability demand torque) (as will be described later).

At a step S4, the CPU of the controller 7 calculates a torque demanded in terms of a vehicular driveability and safety (hereinafter, also referred to as driveability demand torque) (as will be described later).

At a step S5, the CPU of the controller 7 calculates a (relatively) low response demand torque which is operated by 7 the air quantity from among each demand torque.

It is noted that although both of the driver's demand torque and of the revolution stability demand torque may be summed, a priority order (precedence) of demand is allocated to the driveability demand torque (for example, a securing of the safety is a first priority order and a securing of the driveability is a second priority order) and the CPU of the controller 7 calculates the low response demand torque to be achieved in accordance with the priority order.

It is noted that a low response torque operation refers to an operation on, e.g., the air quantity to operate the engine generation torque in order to respond to a slow variation in the demand torque or in order to achieve the demand torque in a steady-state mode and to such a characteristic that a responsive characteristic is low due to an influence such as an intake air charge delay and a favorable follow-up to a transient torque variation cannot be made.

At a step S6, the CPU of the controller 7 synthesizes the revolution stability demand torque and the driveability demand torque to calculate a (relatively) high response demand torque to correct a fuel injection quantity (fuel supply quantity) and an ignition timing.

It is noted that a high response torque operation refers to, for example, an operation on the fuel supply quantity and the ignition timing or only the fuel supply quantity to perform a torque operation having a favorable response characteristic so as to, e.g., respond to an instantaneous torque variation demand or so as to compensate for a response delay in the air component in the low response demand torque operation.

It is noted that it is possible to realize the low response demand torque by operating (controlling) an operated (controlled) object (for example, the fuel supply quantity and ignition timing) of the high response demand torque operation.

For example, it is favorable in terms of a control accuracy that a slight variation in the demand torque is not dependent upon the low response torque operation but is dependent upon the operation for the operated object on the high response demand torque operation (for example, the fuel supply (injection) quantity and the ignition timing).

Figure 5:
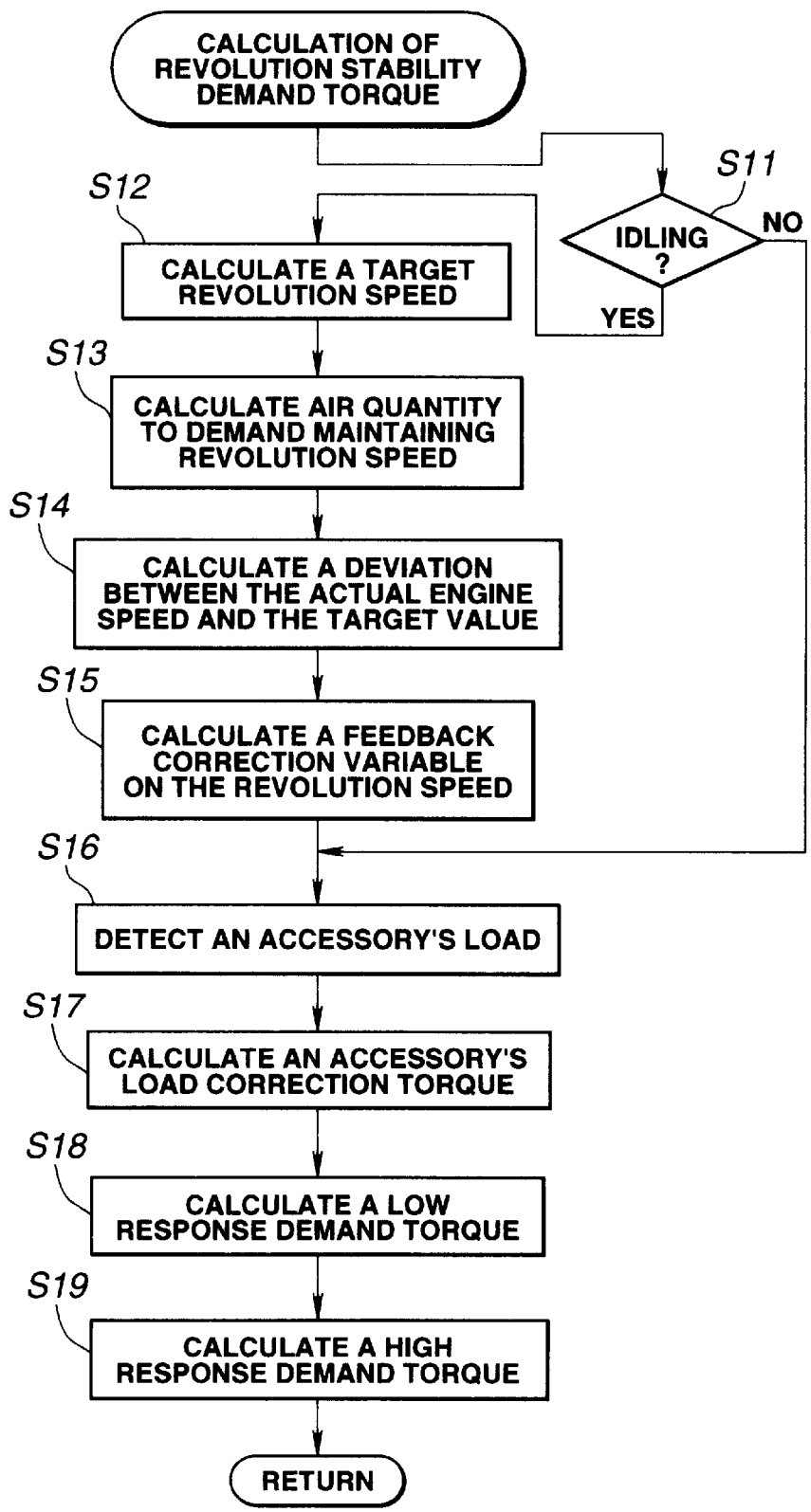
FIG. 5 is a detailed flowchart for explaining a calculation routine of a revolution stability demand torque (an external demand torque) executed in the preferred embodiment.

FIG. 5 shows a calculation routine (step S3 in FIG. 3) on the revolution stability demand torque executed in the preferred embodiment.

It is noted that the revolution stability demand torque is included in an external demand torque in the preferred embodiment.

At a step S11, the CPU of the controller 7 determines whether the engine 4 falls in an idling condition from the present engine operating condition derived on the basis of detection signals of the respective sensors described above (,e.g., the opening angle of the throttle valve 11).

If YES at the step S11, the routine goes to a step S12.

If NO at the step S11, the routine jumps to a step S16.

At the step S12, the CPU of the controller 7 calculates a target revolution speed during the engine idling condition.

At a step S13, the CPU of the controller 7 calculates a target intake air quantity (an intake air quantity to maintain the target revolution speed during the engine idling) required to maintain the engine speed NE at the target revolution speed.

For example, the CPU of the controller 7 retrieves the target intake air quantity from a map (a two-dimensional array) of the target intake air quantity with respect to the engine speed NE and the coolant temperature.

Next, at a step S14, the CPU of the controller 7 calculates a deviation between an actual revolution speed and the target revolution speed derived at the step S12.

At a step S15, the CPU of the controller 7 calculates a feedback correction variable of the intake air quantity (also referred to as a revolution speed feedback correction variable) so as to become the actual revolution speed coincident with the target revolution speed according to the deviation in revolution speed.

At a step S16, the CPU of the controller 7 determines whether any one or more of accessory loads such as an air conditioner, a power assisted steering system, and other electrical loads are being operated.

At a step S17, the CPU of the controller 7 calculates a torque required to correct the accessory load according to the present engine operating condition on the basis of a determination result of the operation condition of any one or more of the accessory loads at the step S16.

At a step S18, the CPU of the controller 7 calculates the demand torque for the revolution speed stabilization on the basis of an intake air quantity which is the addition of both of the target revolution speed maintaining intake air quantity and the revolution speed feedback correction variable and the torque required to correct the accessory load.

In details, the CPU of the controller 7 calculates an intake air quantity which is the sum of the target revolution speed maintaining intake air quantity and the revolution speed feedback correction variable and multiplies the calculation value by a coefficient to derive a torque correspondence value. Since, during the engine idling, the intake air quantity has a linear correlation to the engine torque, it is possible to calculate the demand torque described above in the above-described procedure.

The CPU of the controller 7 sums the value of the intake air quantity converted torque and that of the accessory load correction torque to determine the demanded torque to stabilize the revolution speed.

This revolution stability demand torque is a steady state demand torque, viz., the low response demand torque to be achieved by the low response torque operation.

It is noted that if the present routine does not pass the steps S12 to S15 (viz., the engine 4 does not fall in the idling condition), no consideration of the intake air quantity which is the addition of the target revolution speed maintaining intake air quantity and the revolution speed feedback correction variable is given to the calculation of the revolution stability demand torque.

At a step S19, the CPU of the controller 7 calculates the high response demand torque to respond to the instantaneous torque variation demand. In details, the CPU of the controller 7 calculates a value with a delay element in the intake air system provided (for example, a weight mean processing) and drives a difference between the low response demand torque and the value to determine the high response demand torque.

If the latter is smaller than the former, a positive high response torque correction is resulted and, if not, a negative high response torque correction is resulted.

If the accessory load is switched from its ON state to its OFF state or vice versa, a revolution variation occurs unless the correction of the torque is made with good response. Hence, in order to compensate for the response delay in the air component of the low response demand torque, the correction of the torque is made in terms of the good responsive fuel supply (injection) quantity and ignition timing.

Figure 6:
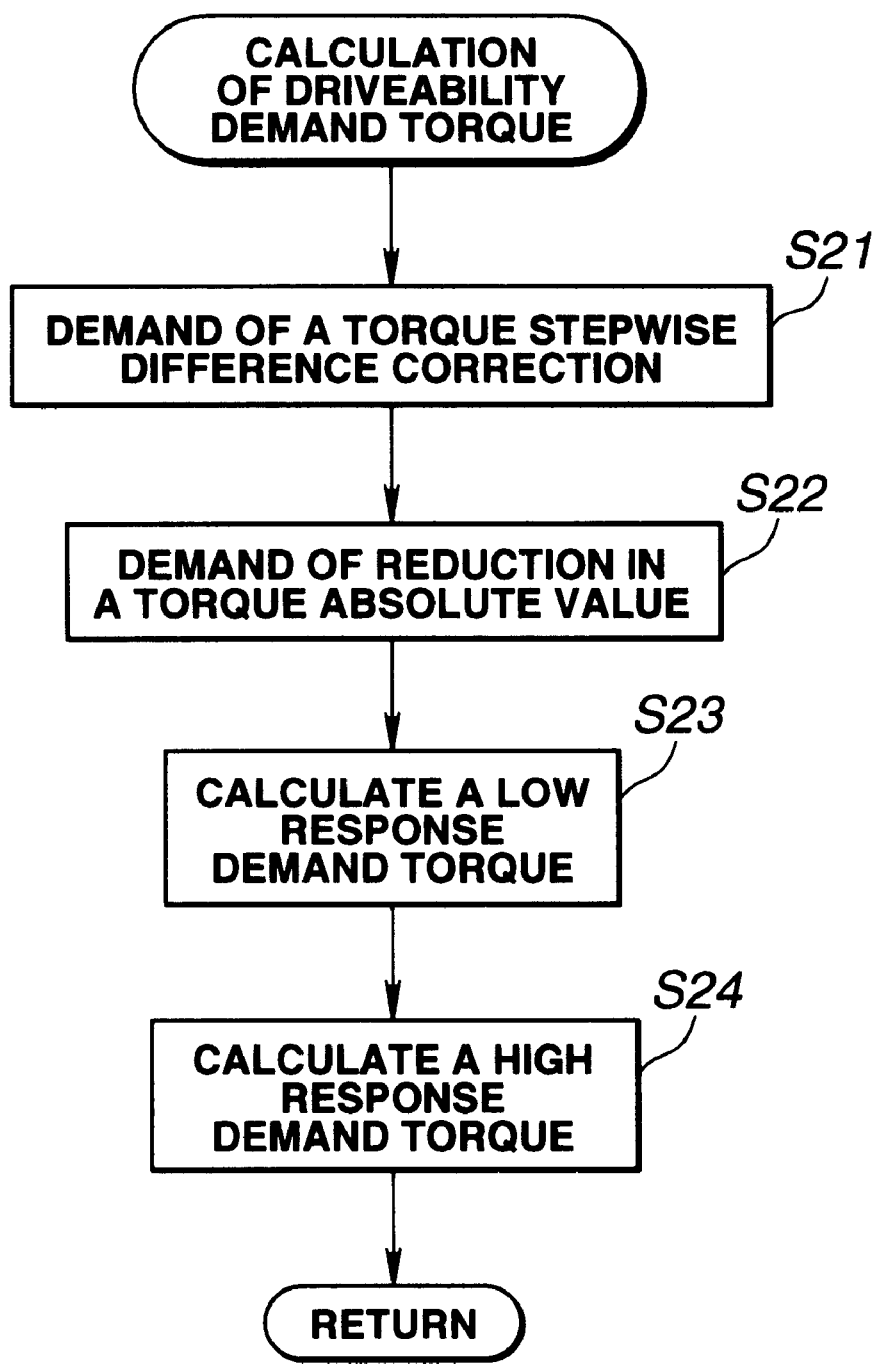
FIG. 6 is a detailed flowchart for explaining a calculation routine of a driveability demand torque (the external demand torque) executed in the preferred embodiment shown in FIG. 1A.

Next, FIG. 6 shows an operational flowchart of the controller 7 (step S4 in FIG. 3) to calculate the driveability demand torque.

It is noted that the driveability demand torque is included in the external demand torque.

At a step S21 of FIG. 6, the CPU of the controller 7 calculates a demand to correct a torque stepwise difference (a torque stepwise difference correction demand).

For example, in a case where the fuel supply is recovered from a fuel cut-off-state during a vehicular deceleration, an abrupt rise in the engine torque would occur if the air-fuel mixture ratio is set in the stepwise manner to a target air-fuel mixture ratio (or a target equivalence ratio).

It is noted that, for the fuel cut-off and fuel recovery, a U.S. Pat. No. 4,395,984 is exemplified(, the disclosure of which is herein incorporated by reference).

In addition, in a case where a gear shift in an automatic transmission associated with the engine 4 occurs, the torque stepwise difference would occur before and after the gear shift occurs.

These phenomena give the driver or the vehicular occupants unpleasant feelings due to a vehicular shock.

Hence, if the engine 4 falls in such an engine operating condition as described above, a limitation is placed on a torque variation rate per time or an upper limit is provided for the torque stepwise difference to eliminate the torque stepwise difference in terms of the vehicular driveability and safety.

At a step S22, the CPU of the controller 7 calculates a demand of an absolute value of the torque.

For example, the CPU of the controller 7 calculates the demand of the absolute value of the torque from a vehicular side although, in a traction control, the torque is operated so as to suppress a slip rate within a certain limit value with a slip rate on a driven wheel detected.

The traction control system is exemplified by a U.S. Pat. No. 5,566,776 (, the disclosure of which is herein incorporated by reference).

The vehicular demand torque during the traction control is derived according to a retrieval of a table on the basis of the detected slip rate of the driven wheel with previously derived target torque with respect to the slip of the driven wheel arranged in the table.

At a step S23, the CPU of the controller 7 selects one of the driveability demand calculated at the steps S21 and S23 whose torque operating width is larger so as to calculate the low response demand torque operated from the air quantity.

At a step S24, the CPU of the controller 7 calculates the high response demand torque so as to compensate for the air response delay of the low response demand torque with respect to the target torque derived in FIG. 3.

Figure 7:
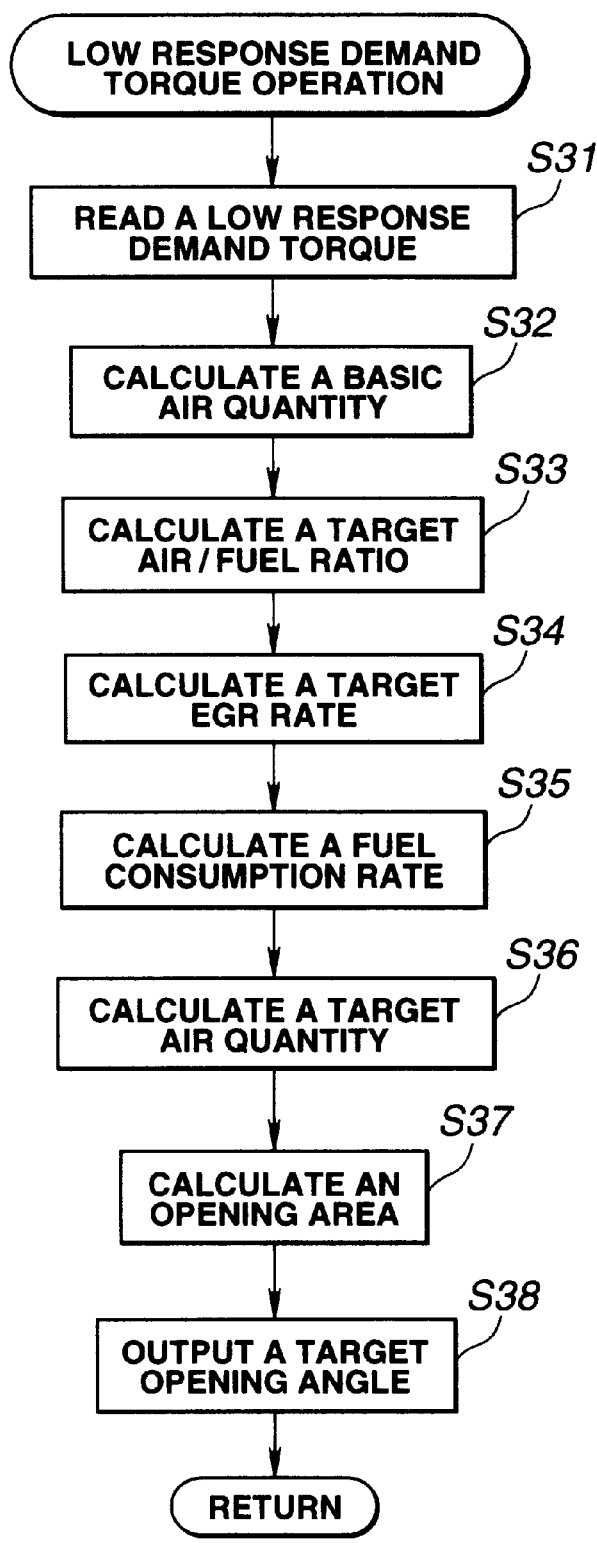
FIG. 7 is a detailed flowchart for explaining a control routine on an operation in an intake air quantity of the engine to achieve a low response demand torque in the preferred embodiment shown in FIG. 1A.

Next, FIG. 7 shows a control routine of the torque operation to realize the low response demand torque.

At a step S31, the CPU of the controller 7 reads the calculated low response demand torque.

At a step S32, the CPU of the controller 7 calculates a basic air quantity (intake air quantity) tTPst per cycle required to generate a combustion of fuel at the stoichiometric air-fuel mixture ratio (1 at an excess air ratio) on the basis of the low response demand torque read at the step S31.

Figure 9A:
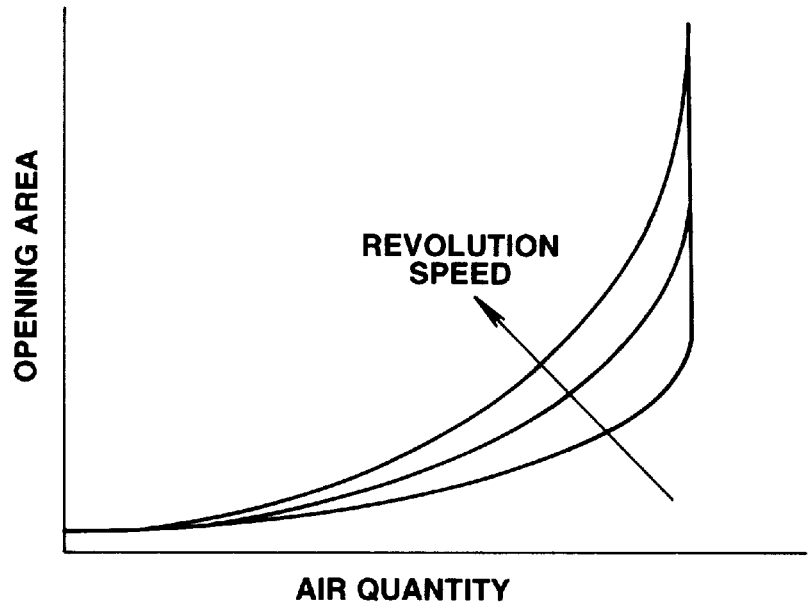
FIG. 9A is an example of a map for referring to an opening area of a throttle valve from a target intake air quantity (intake air quantity).
Figure 9B:
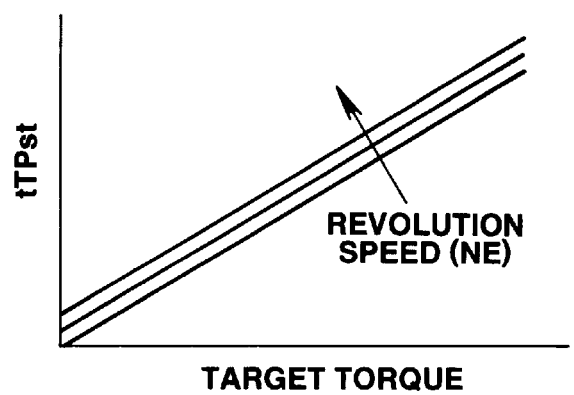
FIG. 9B is an example of a map for referring to a basic air quantity tTPst from the engine revolution speed NE and a target torque.

At the step S32, the basic air quantity tTPst may be retrieved from a map shown in FIG. 9B on the basis of the target torque (in this case, the low response demand torque) and the engine speed (NE).

At a step S33, the CPU of the controller 7 calculates the target air-fuel mixture ratio to be set according to different engine operating conditions.

Figure 9C:
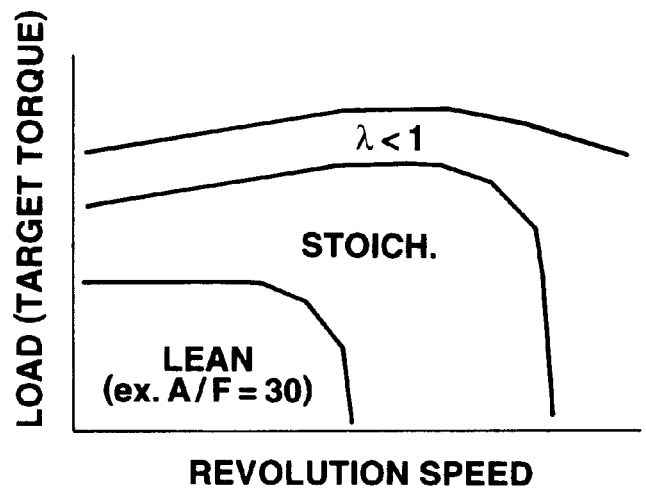
FIG. 9C is an example of a map for referring to an air-fuel mixture ratio from an engine load (or a target torque) and an engine speed.
Figure 9D:
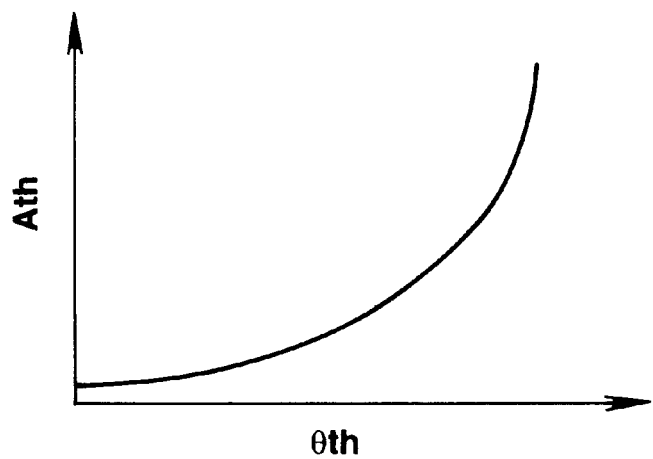
FIG. 9D is an example of a map representing a relationship between a throttle valve opening angle θth and an opening area Ath.

In general, since the set air-fuel mixture ratio is changed according to the engine speed (NE) and an engine load, the CPU of the controller 7 may retrieve the set target air-fuel mixture ratio from a map shown in FIG. 9C on the basis of the engine speed (NE) and the engine load (target torque, in this case, the low response demand torque).

In FIG. 9C, λ denotes the excess air ratio.

At a step S34, the CPU of the controller 7 calculates a target EGR (Exhaust Gas Recirculation) rate to be set according to the different engine operating conditions.

In the same way as the target air-fuel mixture ratio, since, in general, the target EGR rate is varied according to the revolution speed and engine load, the CPU of the controller 7 may retrieve the target EGR rate from a map on the basis of the engine speed (NE) and the target torque.

At a step S35, the CPU of the controller 7 calculates a correction rate ηf according to the air-fuel mixture ratio and the EGR rate since the fuel consumption rate is different according to the air-fuel mixture ratio and EGR rate.

Since, in general, in a case where the air-fuel mixture ratio is in a lean state, the fuel consumption rate is increased due to a reduction in a pumping loss and a reduction in a heat loss and the fuel consumption rate is improved up to a combustion stability limit.

On the other hand, if the EGR is carried out, the pumping loss and thermal loss are reduced. However, the combustion is often worsened and the fuel consumption rate is often reduced according to the set air-fuel mixture ratio.

Figure 8:
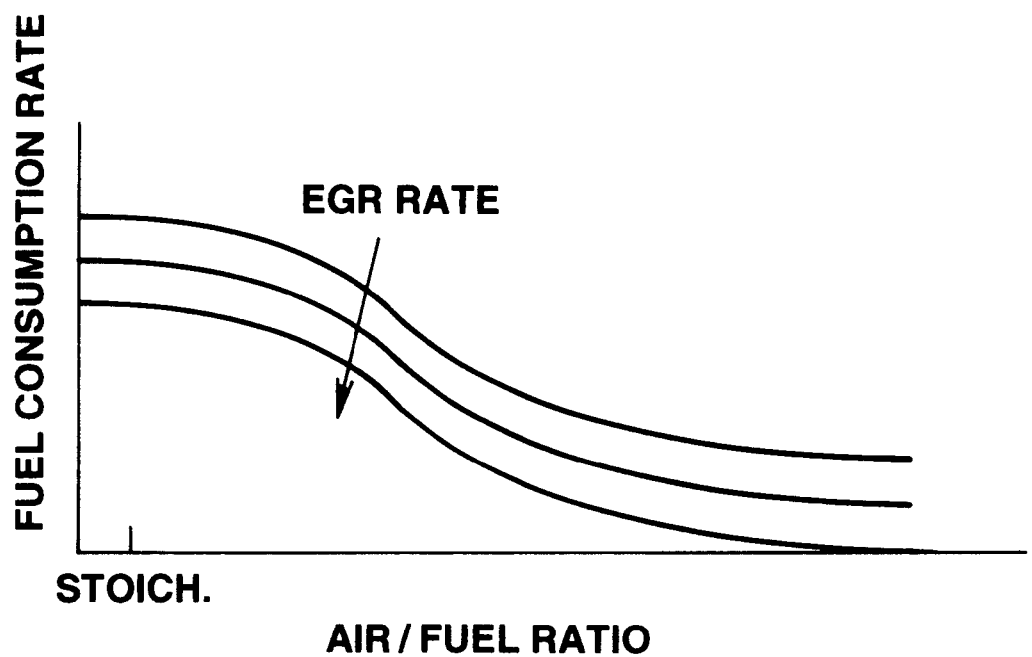
FIG. 8 is an example of a map for referring to a fuel consumption rate (combustion efficiency) from an air-fuel ratio and EGR rate.

For example, as shown in FIG. 8, with the fuel consumption rate (combustion efficiency) with respect to the air-fuel mixture ratio and the EGR rate derived previously through experiments, the CPU of the controller 7 may convert the correction rate into a ratio of 1:η f when the fuel consumption rate (combustion efficiency) during the stoichiometric air-fuel mixture ratio is 1 and may retrieve the correction rate ηf from a map generated on the basis of these data.

At a step S36, the CPU of the controller calculates an actually required target air quantity tTP as follows from the basis air quantity tTPst, a set excess air ratio $\lambda$, and the fuel consumption rate (combustion efficiency):

tTP==tTPst*$\lambda$* ηf.

At a step S37, the CPU of the controller 7 calculates an opening area Ath of the throttle valve 11 according to the target air quantity tTP derived at the step S36.

That is to say, as shown in FIG. 9A, with a correlation of the opening area Atb of the throttle valve 11 with respect to the target air quantity tTP derived through the experiments, the CPU of the controller 7 retrieves the opening area Ath from a map on the basis of the target air quantity tTP and the engine speed (NE).

At a step S38, the CPU of the controller 7 calculates an opening angle θth of the throttle valve 11 according to the opening area Ath of the throttle valve 11.

That is to say, the CPU of the controller 7 retrieves the opening angle θth from a map representing a correlation of the opening angle θth to the opening area Ath determined according to a shape and a dimension of a throttle body for each product.

Then, the CPU of the controller 7 outputs the opening angle θth of the throttle valve 11 derived at the step S38 to the throttle valve controller 12.

Figure 10:
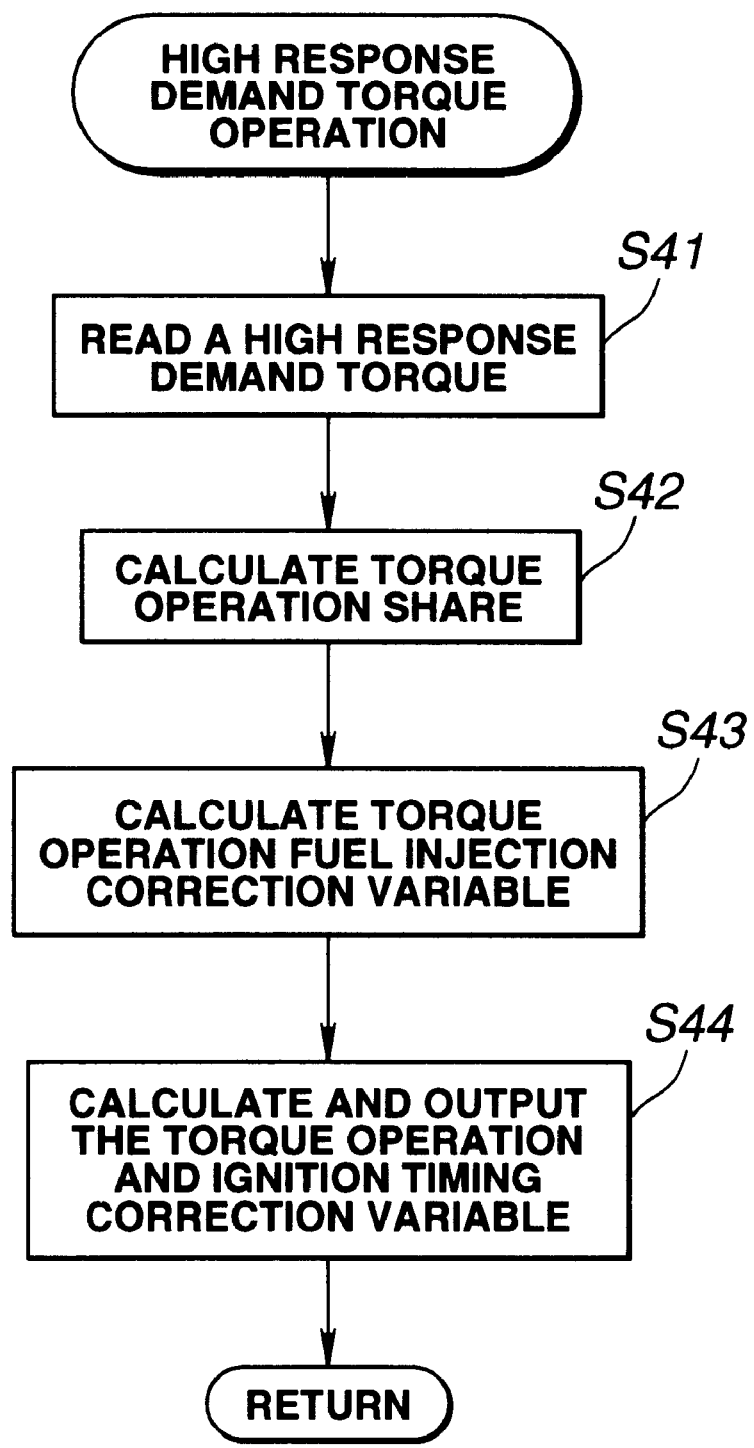
FIG. 10 is a detailed flowchart for explaining a control routine of an operation in a fuel supply (injection) quantity and an ignition timing of the engine to achieve a high response demand torque in the preferred embodiment shown in FIG. 1A.

FIG. 10 shows a control routine of the other torque operation to realize the high response demand torque.

At a step S41, the CPU of the controller 7 reads the high response demand torque.

At a step S42, the CPU of the controller 7 shares (separates) the read high response demand torque into a component operated from the fuel supply (injection) quantity and a component operated from the ignition timing.

This is because it is favorable that according to the engine operating condition sensitivities on the engine generated torque with respect to the fuel supply (injection) quantity and with respect to the ignition timing are different, operating variables to favorably realize the requested torque operation are shared into the operation from the fuel supply (injection) quantity and that from the ignition timing (shared by a predetermined percentage).

At a step S43, the CPU of the controller 7 calculates a correction variable with respect to a based injection quantity on the basis of the operation from the fuel supply (injection) quantity from among the high response demand torque.

The based injection quantity (fuel supply quantity) refers to a set variable through a conventional method so as to enable the achievement of the target air-fuel mixture ratio by the target air quantity tTP.

In details, for example, the CPU of the controller 7 can calculate the target fuel supply quantity as follows: Target Fuel Supply Quantity=tTP/$\lambda$*$\alpha$*$K_L$*COEF, wherein $\alpha$ denotes a, so-called, air-fuel mixture ratio feedback correction coefficient to correct the fuel supply quantity so as to achieve the target air-fuel mixture ratio (stoichiometric air-fuel mixture ratio) on the basis of the detected value of the oxygen sensor 13, $K_L$ denotes a value stored so as to update the deviation of $\alpha$ from its basic value, and COEF denotes various correction coefficients.

It is noted that in a case where the target air-fuel mixture ratio is not the stoichiometric air-fuel mixture ratio, $\alpha$ is set to a predetermined value (for example, 1.0).

At a step S44, the CPU of the controller 7 calculates a correction variable with respect to a based ignition timing on the basis of the operation from the ignition timing from among the high response demand torque.

It is noted that the based ignition timing is set on the basis of the engine speed, the engine load, and the target air-fuel mixture ratio.

Thereafter, the controller 7 drives the fuel injection valves 8 and the ignition plugs 9 with the correction variables to the based fuel supply (injection) quantity calculated at the step S43 and to the based ignition timing calculated at the step S44 taken into consideration.

FIGS. 11A through 11E integrally show an example of the torque operation carried out in the preferred embodiment.

As shown in FIG. 11A, in a case where the vehicle driver increments the demand torque upon a more depression on the accelerator pedal 2 at a certain instant time, the controller 7 controls the opening angle of the throttle valve 11 according to the driver's demand of torque increment (namely, the low response torque operation) so as to realize the target torque.

However, in a case where the accessory load such as the air conditioner is operated and an corrective control is carried out, the torque corresponding to the accessory load is reduced and the driver receives a shock of the torque reduction.

Hence, it is necessary to raise the torque by a value corresponding to the accessory load torque.

In the embodiment, as shown in FIGS. 11B and 11D, he CPU of the controller 7 deems the value corresponding to the accessory load torque to be the low response demand torque, this being achieved by the air quantity operation (low response torque operation, namely, the throttle operation) to maintain the steady state target torque. On the other hand, for a torque insufficient part generated due to the response delay of the air quantity operation (low response torque operation) this is the high response demand torque and is compensated for the operations from the fuel supply (injection) quantity and from the ignition timing (the high response torque operation).

Even if the accessory load is operated, the favorable target torque can be realized without torque difference.

In addition, in a case where the engine generated torque reduction demand to reduce the torque shock during the gear shift in the automatic transmission as shown in FIG. 11C, the torque value corresponding to the torque reduction demand is deemed to be the low response target torque which is achieved by the air quantity operation to maintain the steady-state target value.

On the other hand, for the part (torque insufficient part) along with the response delay of the air quantity operation (low response torque operation), this being the high response demand torque and being compensated for the operations of the fuel supply (injection) quantity and ignition timing (high response torque operation).

Consequently, even if the engine generated torque reduction demand occurs, the favorable target torque can be achieved without occurrence in the torque stepwise difference.

That is to say, since the torque operation can be achieved according to the necessary load operation and external demand torque, it is possible to realize the torque that the driver demands without occurrence in the torque variation.

As described above, in the preferred embodiment of the control apparatus, the target torque is derived on the basis of the torque that the driver has demanded and the external demand torque such as the revolution speed stabilization torque and the torque demanded in terms of the vehicular driveability and safety (the target torque is calculated so as to satisfy every demand), the intake air quantity is operated so as to achieve the target torque and the fuel injection quantity and the ignition timing are operated so as to compensate for the response delay in the operation on the intake air quantity.

Hence, without occurrence in torque variation, it is possible to realize the torque demanded by the driver and by the vehicular side without unreasonability.

Consequently, since the torque demanded by the driver, the torque demanded in terms of the revolution speed stability, the torque demanded in terms of the vehicular driveability can be achieved with high accuracy by means of cooperative (harmonious) controls of the air quantity, fuel supply quantity, and the ignition timing, all of the driver's intention to drive the vehicle, the stability during the idling, and the vehicular driveability can be satisfied.

It is noted that the present invention is applicable to a mechanical device in which the throttle valve is mechanically linked to the vehicular operation through, in the preferred embodiment, the electronical servo device 12 in which a DC motor drives the throttle valve 11 is exemplified as shown in FIG. 1A.

In the case of the mechanical device, an auxiliary air passage bypassing the throttle valve and an auxiliary air valve installed in the auxiliary air passage are disposed in the intake air system of the engine.

In this case, the same advantage as the case of the electronic servo device 12 can be achieved by controlling the auxiliary air valve so as to eliminate a deviation between a total opening area to realize the target air quantity calculated in the same way as the electronic servo device and the opening area of the actually mechanically controlled throttle valve.

Figure 2:
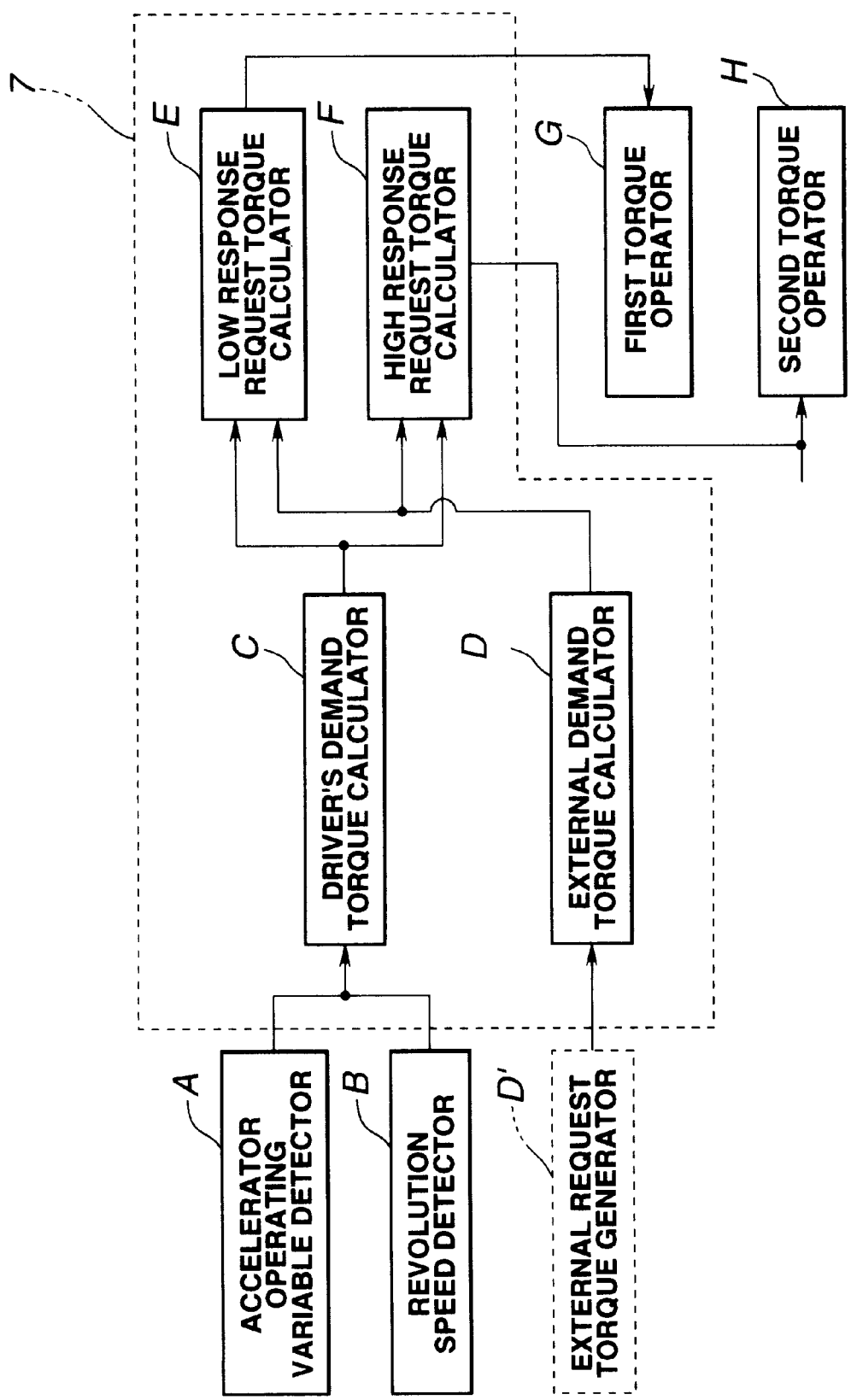
FIG. 2 is a functional block diagram of the control apparatus for the internal combustion engine according to the present invention for explaining a general concept of the present invention.

It is noted that FIG. 2 shows a functional block diagram of the control apparatus according to the present invention.

That is to say, the accelerator operating variable detector A detects the operating variable of the accelerator 2 operated by the driver, the revolution speed detector B detects the revolution speed (NE) of the engine, the driver's demand calculator C calculates the engine torque demanded by the vehicle driver on the basis of the detected operating variable of the accelerator and the detected revolution speed as the driver's demand torque, the external demand torque calculator D calculates the correction variable for the engine torque demanded from the external to the engine as the external demand torque, the (relatively) low response torque demand torque calculator E calculates the (relatively) low response demand torque on the basis of at least one of the driver's demand torque and the external demand torque, the (relatively) high response demand torque calculator F calculates the (relatively) high response demand torque on the basis of at least one of the driver's demand torque and the external demand torque, the first torque operator G operates at least one object to be controlled in the (relatively) low response type so as to realize the calculated (relatively) low response demand torque, and the second torque operator H operates at least one object to be controlled in the (relatively) high response type so as to realize the calculated (relatively) high response demand torque.

It is noted that the external demand torque generator D' shown in FIG. 2 is included in the external demand torque calculator.

What is claimed is:

1. A control apparatus for a vehicular internal combustion engine, comprising:

a) an accelerator operating variable detector for detecting an operating variable of an accelerator operated by a vehicle driver;

b) a revolution speed detector for detecting a revolution speed of the engine;

c) a driver demand torque calculator for calculating an engine torque demanded by the vehicle driver on the basis of the detected operating variable of the accelerator and the detected revolution speed as a driver's demand torque;

d) an external demand torque calculator for calculating a correction variable for the engine torque demanded from an external load to the engine as an external demand torque;

e) a relatively low response demand torque calculator for calculating a relatively low response demand torque on the basis of at least one of the driver's demand torque and the external demand torque;

f) a relatively high response demand torque calculator for calculating a relatively high response demand torque on the basis of at least one of the driver's demand torque and the external demand torque;

g) a first torque operator for operating at least one object to be controlled in a relatively low response characteristic so as to realize the calculated relatively low response demand torque;

h) a second torque operator for operating at least one object to be controlled in a relatively high response characteristic so as to realize the calculated relatively high response demand torque.

2. A control apparatus for a vehicular internal combustion engine as claimed in claim 1, wherein the external demand torque calculator includes a revolution stability demand torque calculator for calculating a revolution stability demand torque demanded according to an operation condition of an engine accessory to stabilize the revolution speed of the engine as the external demand torque.

3. A control apparatus for a vehicular internal combustion engine as claimed in claim 1, wherein the external demand torque calculator includes a driveability demand torque calculator for calculating a driveability demand torque demanded in terms of a vehicular driveability and safety as the external demand torque.

4. A control apparatus for a vehicular internal combustion engine as claimed in claim 1, wherein the relatively low response demand torque calculator calculates a steady-state revolution stability demand torque before and after an operation condition of an engine accessory is switched which is calculated by the external demand torque calculator as the relatively low response demand torque and wherein the relatively high response demand torque calculator calculates the correction variable of the engine torque to compensate for a response delay up to a time point at which the steady-state revolution stability demand torque is realized by the first torque operator as the relatively high response demand torque.

5. A control apparatus for a vehicular internal combustion engine as claimed in claim 1, wherein the relatively high response demand toque calculator calculates a driveability demand torque to temporarily increase or decrease the engine torque so as to reduce a shock to be occurred due to a torque stepwise difference when a fuel supply to the engine is recovered from a state in which the fuel supply to the engine is cutoff as the relatively high response demand torque.

6. A control apparatus for a vehicular internal combustion engine as claimed in claim 1, wherein the relatively high response demand toque calculator calculates a driveability demand torque to temporarily increase or decrease the engine torque so as to reduce a shock to be occurred due to a torque stepwise difference when a gear shift in an automatic transmission associated with the engine occurs.

7. A control apparatus for a vehicular internal combustion engine as claimed in claim 1, wherein the relatively low response demand torque calculator calculates a steady-state driveability demand torque demanded from a traction control and calculated by the external demand torque calculator as the relatively low response demand torque and wherein the relatively high response demand torque calculator calculates the correction variable of the engine torque to compensate for the response delay up to a time point at which the steady-state driveability demand torque is realized by the first torque operator.

8. A control apparatus for a vehicular internal combustion engine as claimed in claim 1, wherein the relatively low response demand torque calculator calculates driveability demand torque parts in terms of a vehicular driveability and safety from among the relatively low response demand-torque calculated from the external demand torque on the basis of a priority order of the driveability demand torque parts.

9. A control apparatus for a vehicular internal combustion engine as claimed in claim 1, wherein the relatively high response demand torque calculator synthesizes the relatively high response demand torque calculated on the basis of the revolution stability demand torque from the external demand torque with the relatively high response demand torque calculated on the basis of the driveablity demand torque from the external demand torque to derive a final relatively high response demand torque.

10. A control apparatus for a vehicular internal combustion engine as claimed in claim 1, wherein the object to be controlled in the relatively low response characteristic is an intake air quantity of the engine.

11. A control apparatus for a vehicular internal combustion engine as claimed in claim 10, wherein the first torque operator includes: a) a basic intake air quantity calculator for calculating a basic intake air quantity required according to the calculated relatively low response demand torque; b) a required intake air quantity calculator for correcting an air quantity according to a target equivalence ratio and correcting a combustion efficiency according to a combustion condition so as to derive an actually required demanded intake air quantity; c) an opening area calculator for calculating an opening area of an intake air controlling valve installed in an intake air system of the engine for controlling the intake air quantity of the engine; and d) an intake air controlling valve controller for controlling an opening angular displacement of the intake air controlling valve on the basis of the calculated opening area.

12. A control apparatus for a vehicular internal combustion engine as claimed in claim 1, wherein the object to be controlled in the relatively high response type includes at least one of a fuel supply quantity of the engine and an ignition timing of the engine.

13. A control apparatus for a vehicular internal combustion engine as claimed in claim 1, wherein when the objects to be controlled in the relatively high response types are plural, the relatively high response demand torque calculator calculates the relatively high response demand torque to be shared with respective objects to be controlled in the relatively high response characteristics in accordance with a share rate calculated on the basis of an engine operating condition and wherein the second torque operator operates the respective objects to be controlled in the relatively high response characteristics so as to realize the respectively high response characteristics so as to realize the respective relatively high response torque to be shared by the respective objects to be controlled in the relatively high response characteristics.

14. An apparatus for a vehicular internal combustion engine as claimed in claim 2, wherein the revolution stability demand torque calculator includes; a) an engine operating condition detector for detecting an engine operating condition other than the engine revolution speed; b) an engine idling condition determinator for determining whether the engine falls in an engine idling condition; c) a target engine idling revolution speed calculator for calculating a target engine idling speed on the basis of the detected engine operating condition; d) an intake air quantity calculator for calculating an intake air quantity required to maintain the engine revolution speed at the target engine idling speed on the basis of the detected engine operating condition; e) a correction quantity calculator for calculating a feedback correction variable for the intake air quantity so as to coincide the detected engine revolution speed with the target engine idling speed; f) an accessory operation condition detector for detecting whether the engine accessory is operated; g) a required torque calculator for calculating a torque required to correct an engine accessory load according to the detected engine operating condition on the basis of a detection result in the accessory operation condition detector and wherein the revolution stability demand torque calculator calculates the revolution stability demand torque on the basis of the intake air quantity which is an addition of the intake air quantity required to maintain the engine revolution speed at the target engine idling speed to the feedback correction variable during the engine idling condition and on the basis of the engine accessory load correction required torque calculated by the required torque calculator.

15. A control apparatus for a vehicular internal combustion engine as claimed in claim 14, wherein the revolution stability demand torque is a steady-state demand torque and the relatively low response demand torque to be achieved by the first torque operator.

16. A control apparatus for a vehicular internal combustion engine as claimed in claim 15, wherein when the accessory operation condition detector detects that the engine accessory is switched from its ON state to its OFF state or vice versa, the revolution stability demand torque calculator calculates the relatively high response demand torque so as to cope with an instantaneous torque variation demand and so as to compensate for a response delay in the first torque operator to the relatively low response demand torque.

17. A control apparatus for a vehicular internal combustion engine as claimed in claim 3, wherein the driveability demand torque calculator includes: a) a first calculator for calculating a torque stepwise difference correction demand; b) a second calculator for calculating an absolute value demand of the torque from a vehicular side; c) a selector for selecting one of the torque stepwise difference correction command and the absolute value demand of the torque whose torque operation width is larger than the other as the relatively low response demand torque; d) a third calculator for calculating a difference between the relatively low response demand torque and a value of the relatively low response demand torque to which a delay element provided in an intake air system of the engine is added to derive the relatively high response demand torque so as to compensate for a response delay in the relatively low response demand torque.

18. A control apparatus for a vehicular internal combustion engine as claimed in claim 17, wherein the first calculator includes a first determinator for determining whether the engine falls in a state wherein a fuel supply to the engine is recovered from a state wherein the fuel supply is cut off during an engine deceleration and the first calculator provides an upper limit for the torque stepwise difference when the first determinator determines that the fuel supply to the engine is recovered from a state wherein the fuel supply is cut off and wherein the first calculator includes a second determinator for determining whether a gear shift in an automatic transmission associated with the engine occurs and the first calculator provides a limitation on a torque variation when the second determinator determines that the gear shift occurs in the automatic transmission.

19. A control apparatus for an internal combustion engine as claimed in claim 17, wherein the second calculator includes a slip rate detector for detecting a slip rate of a driven wheel of the vehicle and the second calculator calculates a target torque according to the detected slip rate, the target torque being the absolute value demand torque.

20. A control method for a vehicular internal combustion engine, comprising:
   a) detecting a first operating variable of an accelerator operated by a vehicle driver;
   b) detecting a revolution speed of the engine;
   c) calculating an engine torque demanded by the vehicle driver on the basis of the detected operating variable of the accelerator and the detected revolution speed as a driver's demand torque;
   d) calculating a correction variable for the engine torque demanded from an external load to the engine as an external demand torque;
   e) calculating a relatively low response demand torque on the basis of at least one of the driver's demand torque and the external demand torque;
   f) calculating a relatively high response demand torque on the basis of at least one of the driver's demand torque and the external demand torque;
   g) operating at least one object to be controlled in a relatively low response characteristic so as to realize the calculated relatively low response demand torque; and
   h) operating at least one object to be controlled in a relatively high response characteristics so as to realize the calculated relatively high response demand torque.

* * * * *